United States Patent
Jeon (10) Patent No.: US 12,254,546 B2
(45) Date of Patent: Mar. 18, 2025

(54) METHOD, SYSTEM, AND NON-TRANSITORY COMPUTER-READABLE RECORDING MEDIUM FOR AUTHORING ANIMATION

(71) Applicant: ANIPEN INC., Seongnam-si (KR)

(72) Inventor: Jae Woong Jeon, Seoul (KR)

(73) Assignee: ANIPEN INC., Seongnam-si (KR)

( * ) Notice: Subject to any disclaimer, the term of this patent is extended or adjusted under 35 U.S.C. 154(b) by 145 days.

(21) Appl. No.: 18/017,496

(22) PCT Filed: Jul. 22, 2021

(86) PCT No.: PCT/KR2021/009515
§ 371 (c)(1),
(2) Date: Jan. 23, 2023

(87) PCT Pub. No.: WO2022/019692
PCT Pub. Date: Jan. 27, 2022

(65) Prior Publication Data
US 2023/0274483 A1    Aug. 31, 2023

(30) Foreign Application Priority Data

Jul. 22, 2020 (KR) .......................... 10-2020-0091310

(51) Int. Cl.
*G06T 13/00* (2011.01)
*G06T 7/20* (2017.01)
(Continued)

(52) U.S. Cl.
CPC ............... *G06T 13/00* (2013.01); *G06T 7/20* (2013.01); *G06T 11/00* (2013.01);
(Continued)

(58) Field of Classification Search
None
See application file for complete search history.

(56) References Cited

U.S. PATENT DOCUMENTS 9,648,271 B2 * 5/2017 Partouche ............ G06T 19/006
2013/0235045 A1 9/2013 Corazza
(Continued)

FOREIGN PATENT DOCUMENTS

KR    1020140070915 A    6/2014
KR    1020150057424 A    5/2015
(Continued)

OTHER PUBLICATIONS

U.S. Appl. No. 63/047,847 date of Jul. 2, 2020. (Year: 2020).*

*Primary Examiner* — Nurun Flora
(74) *Attorney, Agent, or Firm* — Dinsmore & Shohl LLP; Yongsok Choi, Esq.

(57) ABSTRACT

A method for authoring an animation is provided. The method includes the steps of: acquiring characteristic information on an appearance and a motion of a real-world object from an input video; determining a virtual object associated with the real-world object with reference to the characteristic information on the appearance of the real-world object, and determining a virtual motion associated with the real-world object with reference to the characteristic information on the motion of the real-world object; and generating an animation sequence on the basis of the virtual object and the virtual motion.

19 Claims, 7 Drawing Sheets

(51) Int. Cl.
　　　　*G06T 11/00*　　　　(2006.01)
　　　　*G06Q 30/0601*　　　(2023.01)
(52) U.S. Cl.
　　　　CPC ...... *G06Q 30/0631* (2013.01); *G06T 2200/24* (2013.01); *G06T 2207/10016* (2013.01); *G06T 2207/20081* (2013.01)

(56) References Cited

U.S. PATENT DOCUMENTS

| | | | | |
|---|---|---|---|---|
| 2017/0132828 | A1* | 5/2017 | Zelenin | A63F 13/63 |
| 2021/0027511 | A1* | 1/2021 | Shang | G06N 3/044 |
| 2021/0056348 | A1* | 2/2021 | Berlin | G06T 11/60 |
| 2021/0201550 | A1* | 7/2021 | Chen | G06V 20/647 |
| 2022/0005248 | A1* | 1/2022 | Choi | G06V 40/166 |

FOREIGN PATENT DOCUMENTS

| | | | |
|---|---|---|---|
| KR | 1020170067673 A | | 6/2017 |
| KR | 1020190039045 A | | 4/2019 |
| KR | 1020190093759 A | | 8/2019 |
| KR | 1020200052812 A | | 5/2020 |
| KR | 1020200053232 A | | 5/2020 |
| KR | 1020200076647 A | | 6/2020 |

\* cited by examiner

METHOD, SYSTEM, AND NON-TRANSITORY COMPUTER-READABLE RECORDING MEDIUM FOR AUTHORING ANIMATION

CROSS-REFERENCE TO RELATED APPLICATION(S)

This application is a national phase of Patent Cooperation Treaty (PCT) International Application No. PCT/KR2021/009515 filed on Jul. 22, 2021, which claims priority to Korean Patent Application No. 10-2020-0091310 filed on Jul. 22, 2020. The entire contents of PCT International Application No. PCT/KR2021/009515 and Korean Patent Application No. 10-2020-0091310 are hereby incorporated by reference.

FIELD OF THE INVENTION

The present invention relates to a method, system, and non-transitory computer-readable recording medium for authoring an animation.

BACKGROUND

In recent years, there is an increasing demand for contents that can be represented in three dimensions even on a two-dimensional screen of a digital device such as a personal computer or a mobile terminal device. Further, as one-person broadcasting platforms, content creator platforms, and the like are vitalized, there are a growing number of general users who intend to personally author and use three-dimensional (3D) contents.

Content authoring tools have been conventionally employed in authoring such 3D contents. However, it is complicated and difficult to use conventional animation authoring tools, and thus only trained experts can use the tools in general.

In this connection, the inventor(s) present a novel and inventive technique for determining a virtual object and a virtual motion on the basis of characteristic information on an appearance and a motion of a real-world object specified from an input video, and generating an animation sequence on the basis of the virtual object and the virtual motion.

SUMMARY OF THE INVENTION

One object of the present invention is to solve all the above-described problems in the prior art.

Another object of the invention is to assist all people to easily and conveniently author animations using photographed videos.

Yet another object of the invention is to determine a virtual object having an appearance similar to an appearance of a real-world object at or above a predetermined level, among virtual objects purchased and owned by a user on a platform associated with animation authoring, and determine a virtual motion similar to a motion of the real-world object at or above a predetermined level, among virtual motions purchased and owned by the user on the platform associated with animation authoring, and to generate an animation sequence using the determined virtual object and virtual motion.

The representative configurations of the invention to achieve the above objects are described below.

According to one aspect of the invention, there is provided a method for authoring an animation, the method comprising the steps of: acquiring characteristic information on an appearance and a motion of a real-world object from an input video; determining a virtual object associated with the real-world object with reference to the characteristic information on the appearance of the real-world object, and determining a virtual motion associated with the real-world object with reference to the characteristic information on the motion of the real-world object; and generating an animation sequence on the basis of the virtual object and the virtual motion.

According to another aspect of the invention, there is provided a system for authoring an animation, the system comprising: a characteristic information acquisition unit configured to acquire characteristic information on an appearance and a motion of a real-world object from an input video; a determination unit configured to determine a virtual object associated with the real-world object with reference to the characteristic information on the appearance of the real-world object, and determine a virtual motion associated with the real-world object with reference to the characteristic information on the motion of the real-world object; and a sequence generation unit configured to generate an animation sequence on the basis of the virtual object and the virtual motion.

In addition, there are further provided other methods and systems to implement the invention, as well as non-transitory computer-readable recording media having stored thereon computer programs for executing the methods.

According to the invention, it is possible for all people to easily and conveniently author animations using photographed videos.

According to the invention, it is possible to determine a virtual object having an appearance similar to an appearance of a real-world object at or above a predetermined level, among virtual objects purchased and owned by a user on a platform associated with animation authoring, and determine a virtual motion similar to a motion of the real-world object at or above a predetermined level, among virtual motions purchased and owned by the user on the platform associated with animation authoring, and to generate an animation sequence using the determined virtual object and virtual motion.

DETAILED DESCRIPTION OF THE INVENTION

In the following detailed description of the present invention, references are made to the accompanying drawings that show, by way of illustration, specific embodiments in which the invention may be practiced. These embodiments are described in sufficient detail to enable those skilled in the art to practice the invention. It is to be understood that the various embodiments of the invention, although different from each other, are not necessarily mutually exclusive. For example, specific shapes, structures and characteristics described herein may be implemented as modified from one embodiment to another without departing from the spirit and scope of the invention. Furthermore, it shall be understood that the positions or arrangements of individual elements within each embodiment may also be modified without departing from the spirit and scope of the invention. Therefore, the following detailed description is not to be taken in a limiting sense, and the scope of the invention is to be taken as encompassing the scope of the appended claims and all equivalents thereof. In the drawings, like reference numerals refer to the same or similar elements throughout the several views.

Hereinafter, various preferred embodiments of the present invention will be described in detail with reference to the accompanying drawings to enable those skilled in the art to easily implement the invention.

Configuration of the Entire System

Figure 1:
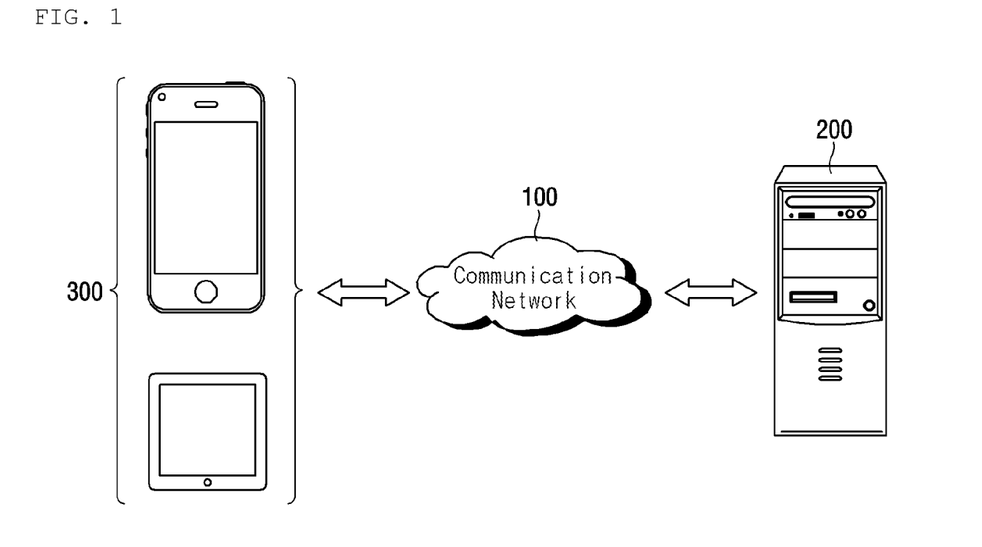
FIG. 1 schematically shows the configuration of an entire system for authoring an animation according to one embodiment of the invention.

FIG. 1 schematically shows the configuration of the entire system for authoring an animation according to one embodiment of the invention.

As shown in FIG. 1, the entire system according to one embodiment of the invention may comprise a communication network 100, an animation authoring system 200, and a device 300.

First, the communication network 100 according to one embodiment of the invention may be implemented regardless of communication modality such as wired and wireless communications, and may be constructed from a variety of communication networks such as local area networks (LANs), metropolitan area networks (MANs), and wide area networks (WANs). Preferably, the communication network 100 described herein may be the Internet or the World Wide Web (WWW). However, the communication network 100 is not necessarily limited thereto, and may at least partially include known wired/wireless data communication networks, known telephone networks, or known wired/wireless television communication networks.

For example, the communication network 100 may be a wireless data communication network, at least a part of which may be implemented with a conventional communication scheme such as radio frequency (RF) communication, WiFi communication, cellular communication (e.g., Long Term Evolution (LTE) communication), Bluetooth communication (more specifically, Bluetooth Low Energy (BLE) communication), infrared communication, and ultrasonic communication.

Next, the animation authoring system 200 according to one embodiment of the invention may be a digital device having a memory means and a microprocessor for computing capabilities. The animation authoring system 200 may be a server system.

The animation authoring system 200 according to one embodiment of the invention may function to: acquire characteristic information on an appearance and a motion of a real-world object from an input video; determine a virtual object associated with the real-world object with reference to the characteristic information on the appearance of the real-world object, and determine a virtual motion associated with the real-world object with reference to the characteristic information on the motion of the real-world object; and generate an animation sequence on the basis of the virtual object and the virtual motion.

The input video according to one embodiment of the invention may refer to a video photographed by at least one camera module (e.g., RGB camera, infrared camera, ultraviolet camera, or time-of-flight (TOF) camera) or at least one scanner module (e.g., LiDAR sensor or radar sensor) in real time or over a predetermined period of time. Further, the input video may include a two-dimensional video or a three-dimensional video. Meanwhile, it is noted that the input video according to one embodiment of the invention is not necessarily limited to the camera module (or the type thereof) or the scanner module (or the type thereof) listed above, and may be diversely changed as long as the objects of the invention may be achieved.

In addition, the real-world object according to one embodiment of the invention may encompass any type of object such as a person or a thing in the real world that may be specified by the at least one camera module or the at least one scanner module.

The configuration and functions of the animation authoring system 200 according to the invention will be discussed in more detail below. Meanwhile, the above description is illustrative although the animation authoring system 200 has been described as above, and it will be apparent to those skilled in the art that at least a part of the functions or components required for the animation authoring system 200 may be implemented or included in the device 300 to be described below or an external system (not shown), as necessary.

Next, the device 300 according to one embodiment of the invention is digital equipment that may function to connect to and then communicate with the animation authoring system 200 via the communication network 100, and any type of portable digital equipment having a memory means and a microprocessor for computing capabilities, such as a smart phone and a tablet PC, may be adopted as the device 300 according to the invention. Further, according to one embodiment of the invention, the device 300 may include at least one camera module or at least one scanner module for acquiring an input video, a display module for playing an animation (e.g., an LCD, an LED display, or an OLED display), and the like.

Meanwhile, the device 300 according to one embodiment of the invention may include an application for supporting the animation authoring functions according to the invention. The application may be downloaded from the animation authoring system 200 or an external application distribution server (not shown).

Configuration of the Animation Authoring System

Figure 2:
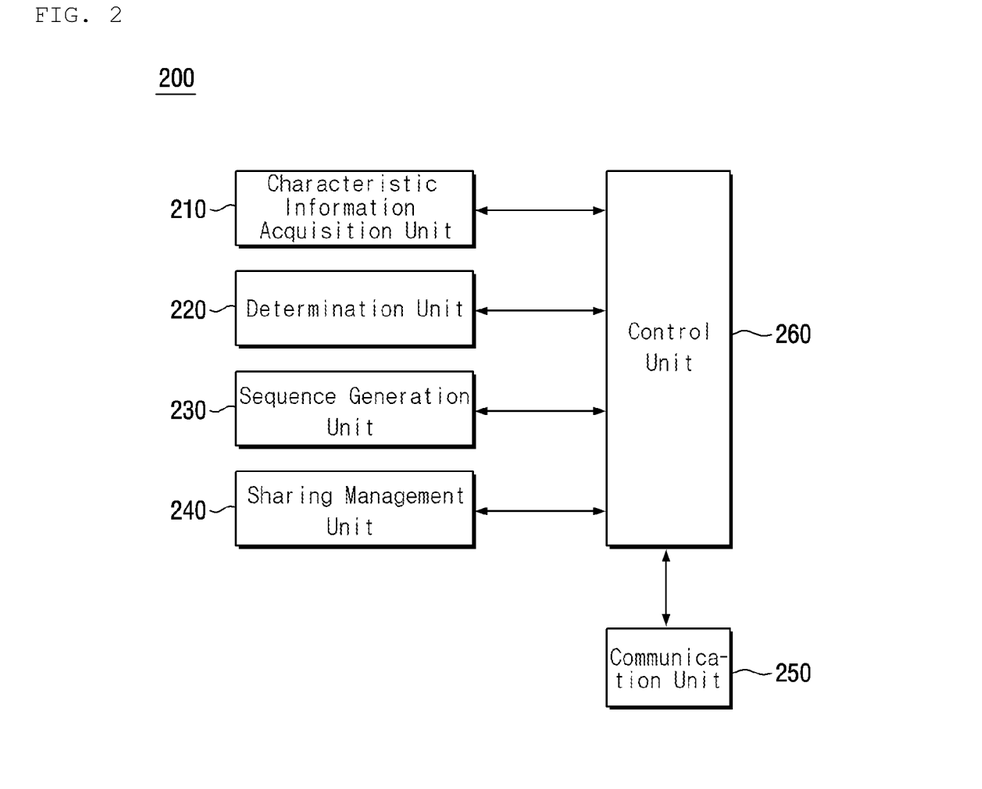
FIG. 2 specifically shows the internal configuration of an animation authoring system according to one embodiment of the invention.

Hereinafter, the internal configuration of the animation authoring system 200 crucial for implementing the invention and the functions of the respective components thereof will be discussed.

FIG. 2 specifically shows the internal configuration of the animation authoring system 200 according to one embodiment of the invention.

As shown in FIG. 2, the animation authoring system 200 according to one embodiment of the invention may comprise a characteristic information acquisition unit 210, a determination unit 220, a sequence generation unit 230, a sharing management unit 240, a communication unit 250, and a control unit 260. According to one embodiment of the invention, at least some of the characteristic information acquisition unit 210, the determination unit 220, the sequence generation unit 230, the sharing management unit 240, the communication unit 250, and the control unit 260 may be program modules that communicate with an external system. The program modules may be included in the animation authoring system 200 in the form of operating systems, application program modules, and other program modules, while they may be physically stored in a variety of commonly known storage devices. Further, the program modules may also be stored in a remote storage device that may communicate with the animation authoring system 200. Meanwhile, such program modules may include, but are not limited to, routines, subroutines, programs, objects, components, and data structures for performing specific tasks or executing specific abstract data types according to the invention as will be described below.

First, the characteristic information acquisition unit 210 according to one embodiment of the invention may function to acquire characteristic information on an appearance and a motion of a real-world object from an input video. The characteristic information on the appearance of the real-world object according to one embodiment of the invention may include information on a size, height, width, shape, color, position, temperature, connection relationship, and the like of the real-world object (specifically, each region or part specified in the real-world object), and the characteristic information on the motion of the real-world object according to one embodiment of the invention may include information on a travel speed, travel route, travel angle, acceleration, angular velocity, and the like of the real-world object (specifically, each region or part specified in the real-world object).

For example, the characteristic information acquisition unit 210 may specify a type of the real-world object (e.g., a person, animal, plant, or thing) from the input video, and extract the characteristic information on the appearance and motion of the real-world object with reference to the type. More specifically, when the type of the real-world object is specified as a person, the characteristic information acquisition unit 210 may specify attributes of each body part of the person with reference to a model for the body structure (e.g., positions, shapes, and connection relationships of the head, face, eyes, nose, mouth, arms, and legs) and movement (e.g., ranges and directions of movement of the head, face, eyes, nose, mouth, arms, and legs) of the person, and extract the characteristic information on the appearance of the person (e.g., gender, height, hairstyle, clothing, and position and size of each part of the face) and the motion of the person (e.g., travel route, travel speed, and travel direction of the person or each body part of the person) on the basis of the specified attributes of each body part of the person. Further, when the type of the real-world object is specified as a bus, the characteristic information acquisition unit 210 may specify attributes of each component of the bus with reference to a model for the structure (e.g., positions, shapes, and orientations of the body, wheels, and windows) and movement (e.g., ranges and directions of movement of the wheels) of the bus, and extract the characteristic information on the appearance and motion of the bus on the basis of the specified attributes of each component of the bus.

As another example, the characteristic information acquisition unit 210 may analyze the real-world object in the input video using an object analysis model for identifying a real-world object (or a type of the real-world object) or extracting characteristics of the real-world object, thereby identifying what (or of what type) the real-world object is, or extracting the characteristic information on the appearance and motion of the real-world object. Here, the object analysis model may be a model that is trained using a plurality of real-world objects and characteristic information on appearances (e.g., a size, height, width, shape, color, position, temperature, connection relationship, and the like of each region or part specified in each real-world object) and motions (e.g., a travel speed, travel route, travel angle, acceleration, angular velocity, and the like of each region or part specified in each real-world object) associated with the plurality of real-world objects. (In this case, at least one of a position of the real-world object, an orientation of the real-world object, and a distance to the real-world object specified in the input video may be further considered in performing the training with respect to the plurality of real-world objects and the characteristic information on the appearances and motions associated with the plurality of real-world objects.) The training may be performed on the basis of an algorithm such as a naive Bayes classifier, support vector machine (SVM), artificial neural network (ANN), and hidden Markov model (HMM). Further, the characteristic information acquisition unit 210 may use one object analysis model to identify a real-world object (or a type of the real-world object) or extract characteristic information on an appearance and a motion of the real-world object, but may also configure and use a first object analysis model for identifying a real-world object (or a type of the real-world object), a second object analysis model for extracting characteristic information on an appearance of the real-world object, and a third object analysis model for extracting characteristic information on a motion of the real-world object, respectively, to identify what the real-world object is or extract the characteristic information on the appearance and motion of the real-world object.

More specifically, the characteristic information acquisition unit 210 may use a first object analysis model for identifying a real-world object (or a type of the real-world object) to identify, from the input video, what (or of what type) the real-world object in the input video is. (In this case, the real-world object (or the type of the real-world object) may be identified by inputting the input video or data on the real-world object in the input video to the first object analysis model and performing detection, classification, segmentation, and recognition processes.) Further, the characteristic information acquisition unit 210 may use a second object analysis model for extracting characteristic information on an appearance of the real-world object to extract the characteristic information on the appearance of the real-world object. (In this case, the characteristic information on the appearance of the real-world object may be extracted by inputting the input video or data on the real-world object in the input video to the second object analysis model and performing detection, classification, segmentation, and recognition processes.) Furthermore, the characteristic information acquisition unit 210 may use a third object analysis model for extracting characteristic information on a motion of the real-world object to extract the characteristic information on the motion of the real-world object. (In case, the characteristic information on the motion of the real-world object may be extracted by inputting the input video or data on the real-world object in the input video to the third object analysis model and performing detection, classification, segmentation, and recognition processes.) Meanwhile, the third object analysis model may further include a learning model (e.g., a learning model for working with skeletons) for recognizing a skeleton of a real-world object and connecting skeleton points (e.g., joint points if the real-world object is a person), a learning model for recognizing an action of a real-world object on the basis of its skeleton, a learning model for recognizing a situation associated with a real-world object, and the like.

In addition, the characteristic information acquisition unit 210 may further acquire characteristic information on an emotion of the real-world object from the input video. The characteristic information on the emotion of the real-world object according to the invention may include information on a type of the emotion (e.g., joyful, angry, sad, amused, happy, or irritated) and an intensity (or strength) of the emotion.

For example, the characteristic information acquisition unit 210 may specify a type of the real-world object (e.g., a person, animal, plant, or thing) from the input video, and acquire characteristic information on an emotion of the real-world object with reference to the type. More specifically, when the type of the real-world object is specified as a person, the characteristic information acquisition unit 210 may specify attributes of each body part of the person with reference to a model for the body structure (e.g., positions, shapes, and connection relationships of the head, face, eyes, nose, mouth, arms, and legs) and movement (e.g., ranges and directions of movement of the head, face, eyes, nose, mouth, arms, and legs) of the person, and extract the characteristic information on the emotion of the person on the basis of the specified attributes of each body part of the person.

As another example, the characteristic information acquisition unit 210 may analyze the real-world object in the input video with reference to an object analysis model for extracting emotion-related characteristics from a real-world object, thereby extracting the characteristic information on the emotion of the real-world object. The configuration and form of the object analysis model may be at least partially similar to those of the above-described object analysis model for extracting the characteristic information on the appearance or motion.

As another example, the characteristic information acquisition unit 210 may extract the characteristic information on the emotion of the real-world object on the basis of the characteristic information on at least one of the appearance and motion of the real-world object. More specifically, when the real-world object is a person, for example, the characteristic information acquisition unit 210 may specify positions of the eyes and a position, shape, and movement of the mouth from the characteristic information on the person's appearance and motion, and determine a type of the person's emotion on the basis thereof, or may specify movements, travel routes, and travel speeds of the hands and legs (or feet) from the characteristic information on the person's appearance and motion, and determine a type of the person's emotion on the basis thereof. (For example, when the person is hovering in a certain place, the emotion may be specified as anxiety). Further, when the real-world object is a person, for example, the characteristic information acquisition unit 210 may specify changes or holding times of positions of the eyes and a position, shape, and movement of the mouth from the characteristic information on the person's appearance and motion, and determine an intensity of the person's emotion on the basis thereof, or may specify changes and holding times of movements, travel routes, and travel speeds of the hands, legs, or feet from the characteristic information on the person's motion, and determine an intensity of the person's emotion on the basis thereof.

Meanwhile, it is noted that characteristic information on an emotion of a real-world object according to one embodiment of the invention is not necessarily distinct from characteristic information on a motion of the real-world object, and may be included in the characteristic information on the motion of the real-world object, as necessary.

Next, the determination unit 220 according to one embodiment of the invention may function to determine a virtual object associated with the real-world object with reference to the characteristic information on the appearance of the real-world object, and determine a virtual motion associated with the real-world object with reference to the characteristic information on the motion of the real-world object.

For example, the determination unit 220 may determine an object having an appearance similar to the appearance of the real-world object at or above a predetermined level, among a plurality of virtual objects, as the virtual object associated with the real-world object on the basis of the characteristic information on the appearance of the real-world object, and may determine a motion similar to the motion of the real-world object at or above a predetermined level, among a plurality of virtual motions, as the virtual motion associated with the real-world object on the basis of the characteristic information on the motion of the real-world object. Here, the plurality of virtual objects and the plurality of virtual motions may be preset by a database of virtual objects and virtual motions (which may be included in the animation authoring system 200 according to the invention or provided in an external system), or may be purchased and owned by a user on a platform associated with animation authoring according to the invention (in which case the plurality of virtual objects and the plurality of virtual motions may vary by user).

Meanwhile, the presence or absence of a skeleton of the real-world object may change how the determination unit 220 determines a virtual motion similar to the motion of the real-world object.

For example, when the real-world object has a skeleton, a virtual motion similar to the motion of the real-world object at or above a predetermined level may be determined on the basis of information on changes in the skeleton of the real-world object (which may belong to the characteristic information on the motion of the real-world object), and when the real-world object does not have a skeleton, a virtual motion similar to the motion of the real-world object at or above a predetermined level may be determined on the basis of the characteristic information on the motion of the real-world object that is divided by unit time or region (i.e., a plurality of pieces of unit characteristic information on the motion of the real-world object). Meanwhile, it is noted that the manner of determining the virtual motion similar to the motion of the real-world object according to one embodiment of the invention is not necessarily limited to the manner as described above, and may be changed without limitation as long as the objects of the invention may be achieved.

Further, the determination unit 220 may determine at least one of the virtual object and the virtual motion with further reference to personal information of the user. The user's personal information according to one embodiment of the invention may include information on the user's age, gender, race, region, preferred virtual object, preferred virtual motion, and the like.

For example, the determination unit 220 may specify a virtual object and a virtual motion preferred by a user associated with animation authoring (or an owner of the device 300) on the basis of personal information of the user, and may assign greater weights to the virtual object and the virtual motion preferred by the user, among a plurality of virtual objects and a plurality of virtual motions, than to the other virtual objects and virtual motions. That is, in determining at least one of the virtual object and the virtual motion, the user's preference for a particular virtual object and virtual motion may be further considered.

Next, the sequence generation unit 230 according to one embodiment of the invention may function to generate an animation sequence on the basis of the virtual object and the virtual motion.

For example, the sequence generation unit 230 may generate an animation sequence in which the virtual object performs the virtual motion for a predetermined amount of time (which may be, for example, equal to the amount of time that the above-described real-world object performs the motion). More specifically, the sequence generation unit 230 may generate an animation sequence in which the virtual object performs the virtual motion while traveling in a route that is equal or similar to the travel route of the real-world object.

Further, the sequence generation unit 230 may generate at least one of an augmented reality (AR) video and a mixed reality (MR) video by combining the animation sequence generated on the basis of the virtual object and the virtual motion with a real-world video.

For example, the sequence generation unit 230 may generate an augmented reality video by combining the animation sequence with the input video as a background. More specifically, the sequence generation unit 230 may generate an augmented reality video in which the virtual object performs the virtual motion while traveling in a route equal or similar to the travel route of the real-world object against a background obtained by removing the real-world object from the input video.

Next, the sharing management unit 240 according to one embodiment of the invention may allow the animation sequence generated by the sequence generation unit 230, or a video generated in combination with the animation sequence (e.g., an augmented reality video or a mixed reality video), to be shared between a plurality of users.

For example, the sharing management unit 240 may allow the animation sequence or the augmented reality video generated in combination with the animation sequence to be shared (e.g., in real time) via a social network service (SNS), cloud, web server, or the like of a user associated with animation authoring (or an owner of the device 300) with other users.

Meanwhile, the sharing management unit 240 may provide a user interface for allowing other users to add or modify at least one of the virtual object and the virtual motion in the shared animation sequence, or to change the virtual object or the virtual motion to a different virtual object or virtual motion. That is, the virtual object or the virtual motion in the shared animation sequence may be added, modified, or changed by other users.

Next, the communication unit 250 according to one embodiment of the invention may function to enable data transmission/reception from/to the characteristic information acquisition unit 210, the determination unit 220, the sequence generation unit 230, and the sharing management unit 240.

Lastly, the control unit 260 according to one embodiment of the invention may function to control data flow among the characteristic information acquisition unit 210, the determination unit 220, the sequence generation unit 230, the sharing management unit 240, and the communication unit 250. That is, the control unit 260 according to one embodiment of the invention may control data flow into/out of the animation authoring system 200 or data flow among the respective components of the animation authoring system 200, such that the characteristic information acquisition unit 210, the determination unit 220, the sequence generation unit 230, the sharing management unit 240, and the communication unit 250 may carry out their particular functions, respectively.

FIGS. 3 to 10 illustratively show how to author an animation according to one embodiment of the invention.

First Embodiment

A situation may be assumed in which the animation authoring system 200 according to one embodiment of the invention is included in a user's smart phone 300.

Figure 3:
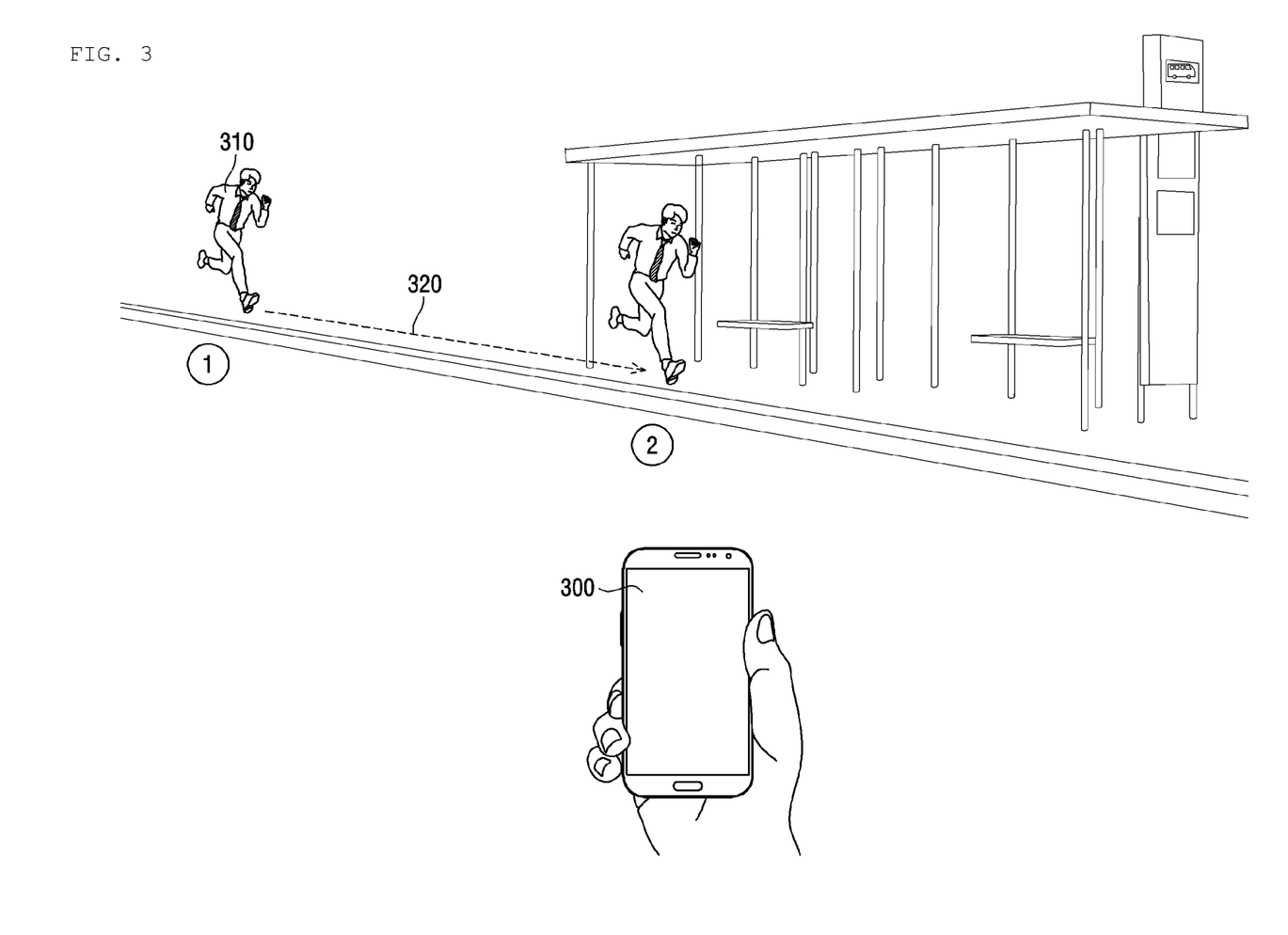
FIG. 3 illustratively shows how to author an animation according to one embodiment of the invention.

First, referring to FIG. 3, according to one embodiment of the invention, a video in which a person 310 wearing a suit runs from a location #1 to a location #2 may be acquired as an input video through a photographing module of the user's smart phone 300.

Next, according to one embodiment of the invention, characteristic information on an appearance, motion, and emotion of the person (i.e., real-world object) 310 may be acquired from the acquired input video.

For example, with reference to at least one object analysis model (which may be a model generated by performing deep learning with respect to real-world objects and characteristic information on appearances, motions, and emotions associated with the real-world objects), it may be determined from the input video that the type of the real-world object 310 is a person, and the characteristic information on the appearance, motion, and emotion of the real-world object 310 may be acquired.

More specifically, information indicating that a 180 cm tall male with a pomade hairstyle wears a white shirt, dress pants, and a tie, and that the eyes, nose, and mouth of the face are located in certain positions (e.g., the length from the hairline of the face to the bottom of the eyebrows, the length from the bottom of the eyebrows to the base of the nose, and the length from the base of the nose to the tip of the chin are the same, and the horizontal length of the face is five times the horizontal length of one eye) may be extracted as the characteristic information on the appearance of the real-world object 310. Further, information indicating that both the elbows are bent at 80 degrees and move back and forth repeatedly at a certain speed, and that both the knees bend and extend repeatedly at a certain speed may be extracted as the characteristic information on the motion of the real-world object 310. Furthermore, laughter with a low intensity (e.g., the intensity may be graded in several or dozens of levels depending on the intensity of the emotion) may be extracted as the characteristic information on the emotion of the real-world object 310.

Next, according to one embodiment of the invention, a virtual object associated with the real-world object 310 may be determined with reference to the characteristic information on the appearance of the real-world object 310, a virtual motion associated with the real-world object 310 may be determined with reference to the characteristic information on the motion of the real-world object 310, and a virtual emotion associated with the real-world object 310 may be determined with reference to the characteristic information on the emotion of the real-world object 310.

Figure 4A:
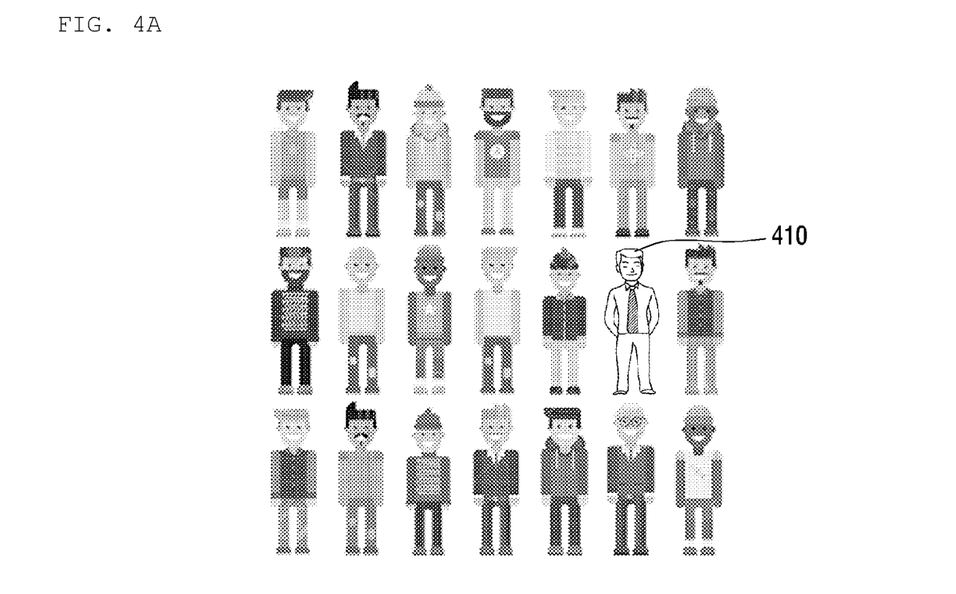
FIGS. 4A and 4B illustratively show how to author an animation according to one embodiment of the invention.
Figure 4B:
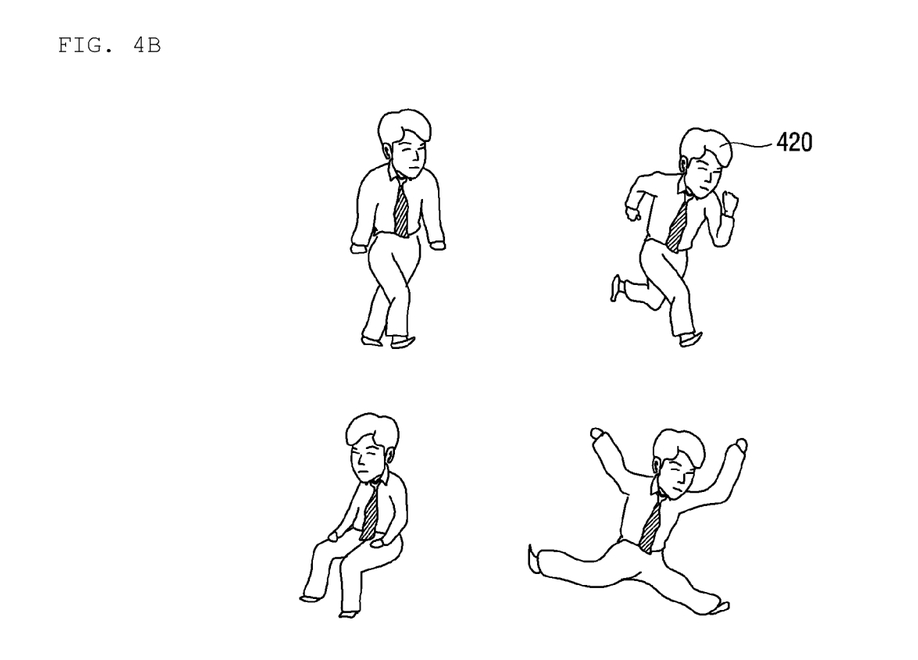

For example, referring to FIGS. 4A and 4B, an object having an appearance similar to the appearance of the real-world object 310 at or above a predetermined level, among a plurality of virtual objects (see FIG. 4A) stored in the user's smart phone or an external system, or purchased and owned by the user on a platform associated with animation authoring, may be determined as a virtual object 410 on the basis of the characteristic information on the appearance of the real-world object 310. Further, a motion similar to the motion of the real-world object 310 at or above a predetermined level, among a plurality of virtual motions (see FIG. 4B) stored in the user's smart phone or external system, or purchased and owned by the user on the animation authoring platform, may be determined as a virtual motion 420 on the basis of the characteristic information on the motion of the real-world object 310. Furthermore, an emotion similar to the emotion of the real-world object 310 at or above a predetermined level, among a plurality of virtual emotions stored in the user's smart phone or external system, or purchased and owned by the user on the animation authoring platform, may be determined as a virtual emotion on the basis of the characteristic information on the emotion of the real-world object 310.

Next, an animation sequence may be generated on the basis of the virtual object 410, the virtual motion 420, and the virtual emotion determined as above.

Figure 5:
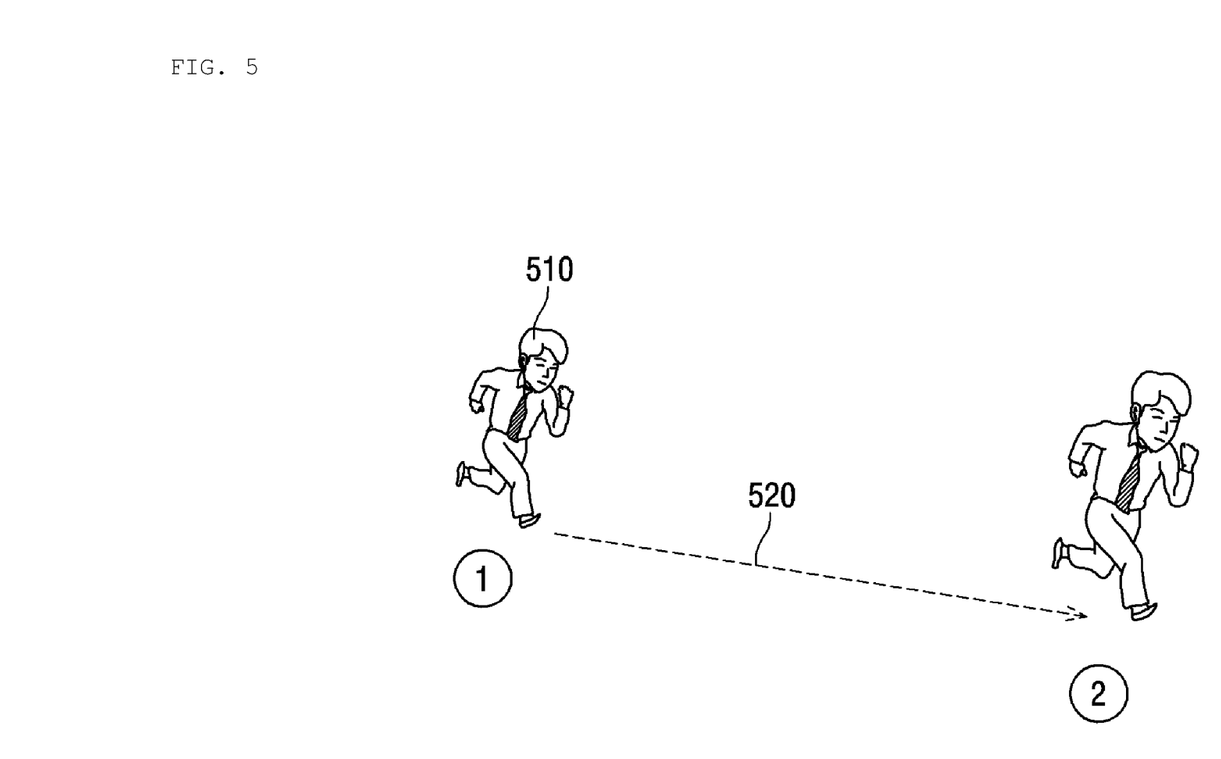
FIG. 5 illustratively shows how to author an animation according to one embodiment of the invention.

For example, referring to FIG. 5, an animation sequence may be generated in which a virtual object 510 expressing a virtual emotion performs the virtual motion 420 while traveling in a route 520 that is equal or similar to a travel route 320 of the real-world object 310.

Figure 6:
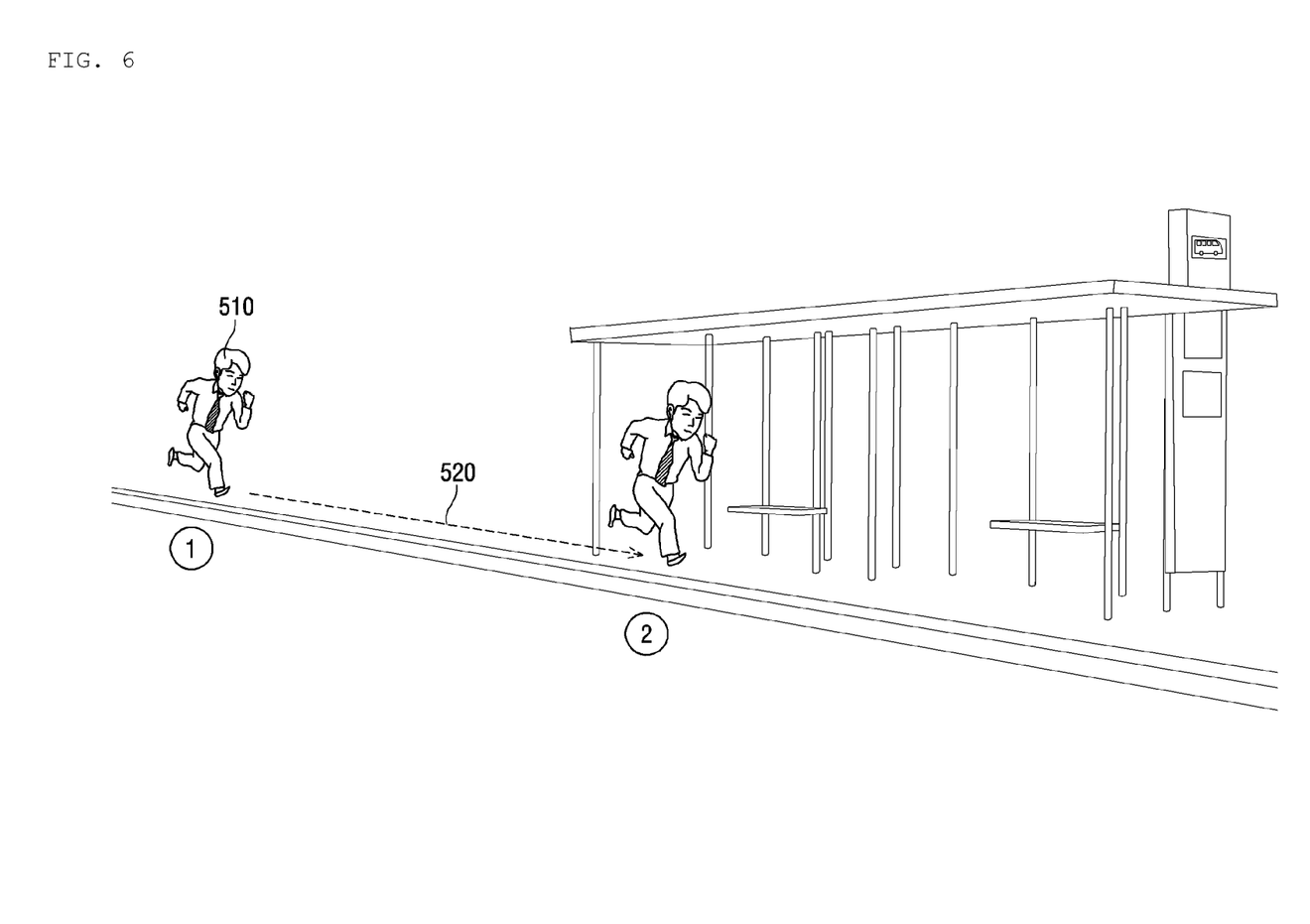
FIG. 6 illustratively shows how to author an animation according to one embodiment of the invention.

Next, according to one embodiment of the invention, an augmented reality video may be generated by combining the generated animation sequence with the input video acquired via the smart phone 300 (see FIG. 6).

Second Embodiment

A situation may be assumed in which the animation authoring system 200 according to one embodiment of the invention and augmented reality glasses 300 of a user interwork via the communication network 100.

Figure 7:
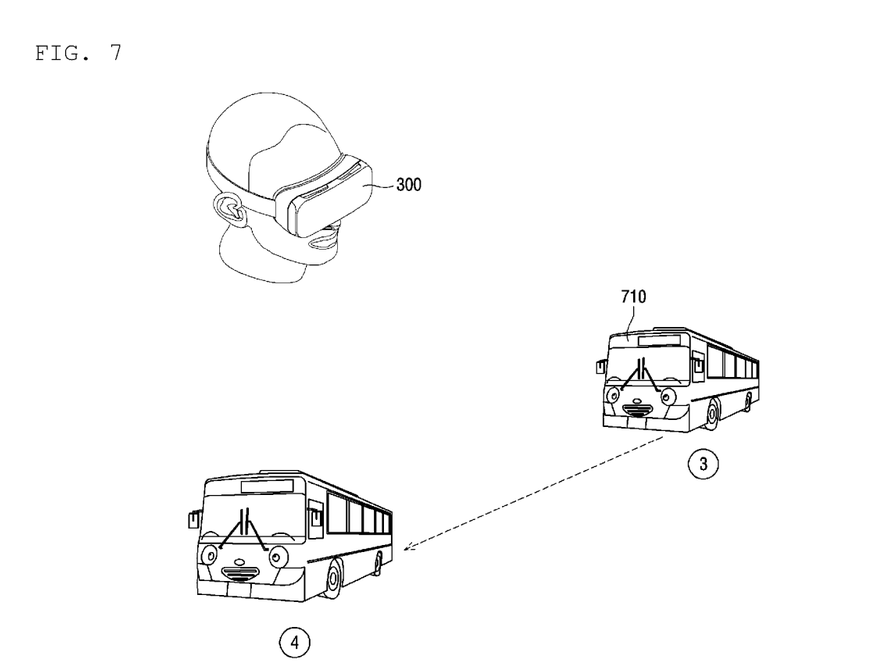
FIG. 7 illustratively shows how to author an animation according to one embodiment of the invention.

First, referring to FIG. 7, according to one embodiment of the invention, a video in which a blue bus (i.e., a real-world object) 710 drives from a location #3 to a location #4 may be acquired as an input video by the user's augmented reality glasses 300.

Next, according to one embodiment of the invention, it may be determined from the acquire input video that the type of the real-world object 710 in the input video is a bus, and characteristic information on an appearance and a motion of the real-world object 710 may be extracted.

Next, a blue Tayo character bus that is an object whose type and appearance are similar to those of the real-world object 710 at or above a predetermined level, among a plurality of virtual objects, may be determined as a virtual object on the basis of the characteristic information on the type and appearance of the real-world object 710. Further, an accelerated driving motion that is a motion similar to the motion of the real-world object 710 at or above a predetermined level, among a plurality of virtual motions, may be determined as a virtual motion on the basis of (e.g., by successively comparing) a plurality of pieces of unit characteristic information on the motion of the real-world object 710, which are specified by dividing the characteristic information on the motion of the real-world object 710 by unit time or region.

Figure 8:
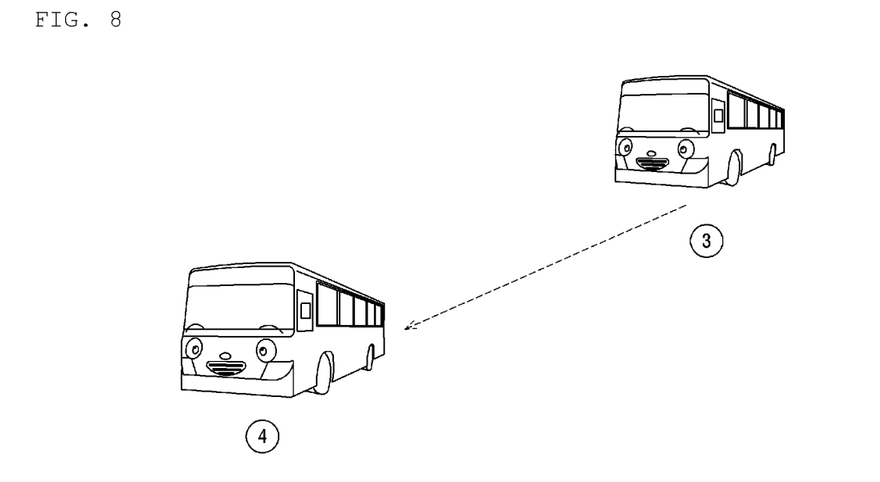
FIG. 8 illustratively shows how to author an animation according to one embodiment of the invention.

Next, referring to FIG. 8, an animation sequence may be generated in which the blue Tayo character bus determined as the virtual object repeatedly performs the accelerated driving motion determined as the virtual motion for a predetermined amount of time (which may be, for example, equal to the amount of time that the blue bus (i.e., the real-world object) 710 performs the motion associated therewith) while traveling from the location #3 to the location #4.

Third Embodiment

A situation may be assumed in which an animation sequence or an augmented reality video generated by the animation authoring system 200 according to one embodiment of the invention is shared with other users via a social network.

Figure 9:
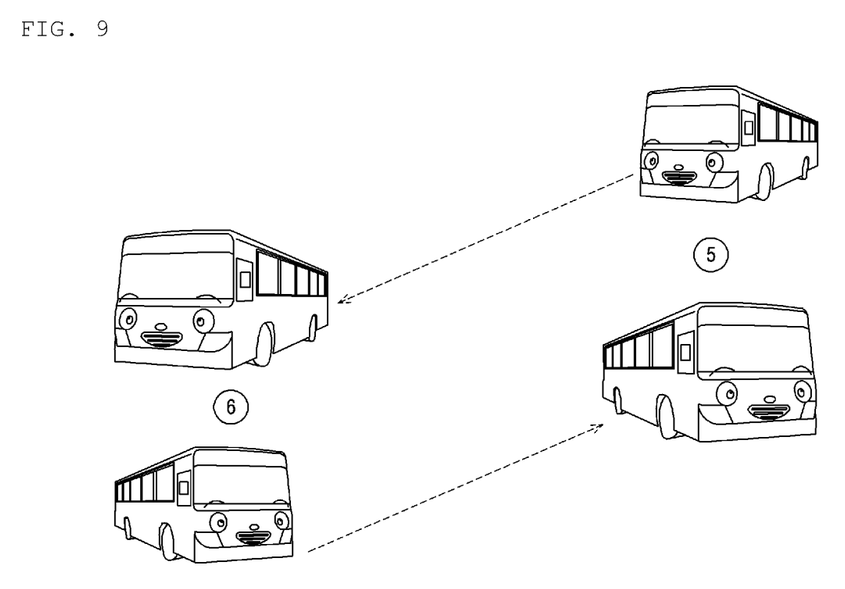
FIG. 9 illustratively shows how to author an animation according to one embodiment of the invention.

First, referring to FIG. 9, according to one embodiment of the invention, a first user may generate an animation sequence in which a blue bus repeatedly travels between a location #5 and a location #6.

Next, at the request of the first user, the generated animation sequence may be shared with a second user via a social network service.

Figure 10:
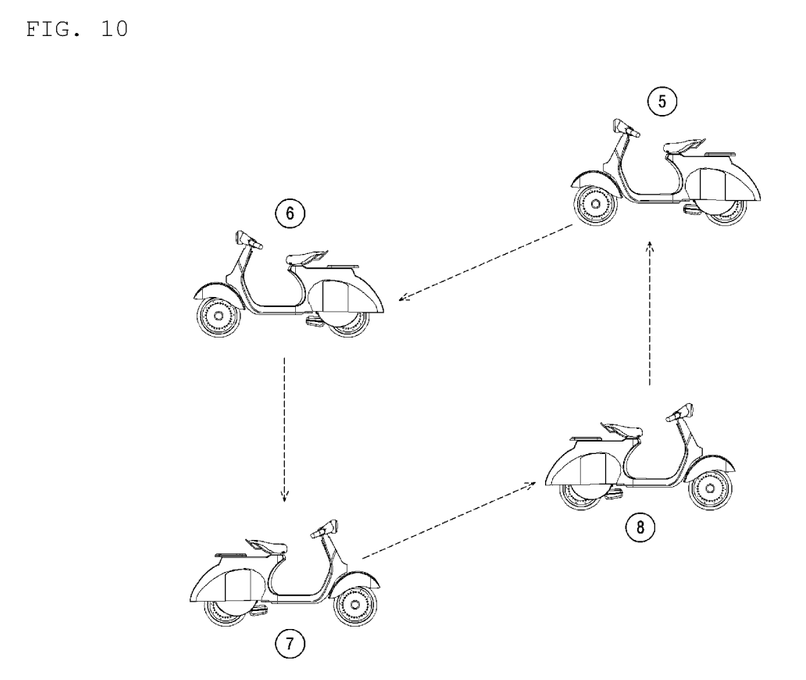
FIG. 10 illustratively shows how to author an animation according to one embodiment of the invention.

Next, referring to FIG. 10, a user interface for modifying the shared animation sequence may be provided to the second user, and the second user may use the user interface to modify the blue bus repeatedly traveling between the locations #5 and #6 in the animation sequence to a red motorcycle repeatedly traveling between the locations #5, #6, #7, and #8. That is, the virtual object and the virtual motion performed by the virtual object may be changed in the shared animation sequence.

The embodiments according to the invention as described above may be implemented in the form of program instructions that can be executed by various computer components, and may be stored on a computer-readable recording medium. The computer-readable recording medium may include program instructions, data files, and data structures, separately or in combination. The program instructions stored on the computer-readable recording medium may be specially designed and configured for the present invention, or may also be known and available to those skilled in the computer software field. Examples of the computer-readable recording medium include the following: magnetic media such as hard disks, floppy disks and magnetic tapes; optical media such as compact disk-read only memory (CD-ROM) and digital versatile disks (DVDs); magneto-optical media such as floptical disks; and hardware devices such as read-only memory (ROM), random access memory (RAM) and flash memory, which are specially configured to store and execute program instructions. Examples of the program instructions include not only machine language codes created by a compiler, but also high-level language codes that can be executed by a computer using an interpreter. The above hardware devices may be changed to one or more software modules to perform the processes of the present invention, and vice versa.

Although the present invention has been described above in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

What is claimed is:

1. A method for authoring an animation, the method comprising the steps of:
acquiring characteristic information on an appearance and a motion of a real-world object from an input video;
determining a virtual object associated with the real-world object with reference to the characteristic information on the appearance of the real-world object, and determining a virtual motion associated with the real-world object with reference to the characteristic information on the motion of the real-world object; and
generating an animation sequence on the basis of the virtual object and the virtual motion,
wherein in the determining step, a virtual motion similar to the motion of the real-world object at or above a predetermined level, among a plurality of virtual motions, is determined as the virtual motion associated with the real-world object, and
wherein a manner of determining the virtual motion similar to the motion of the real-world object at or above the predetermined level is changed according to presence or absence of a skeleton of the real-world object.

2. The method of claim 1, wherein in the acquiring step, the characteristic information on the appearance and motion of the real-world object is extracted by analyzing the real-world object in the input video using an object analysis model, and
wherein the object analysis model is a model that is trained using a plurality of real-world objects and characteristic information on appearances and motions associated with the plurality of real-world objects.

3. The method of claim 1, wherein in the acquiring step, the characteristic information on the appearance and motion of the real-world object is extracted with reference to a type of the real-world object specified in the input video.

4. The method of claim 1, wherein in the acquiring step, characteristic information on an emotion of the real-world object is further acquired from the input video.

5. The method of claim 1, wherein in the determining step, a virtual object having an appearance similar to the appearance of the real-world object at or above a predetermined level, among a plurality of virtual objects, is determined as the virtual object associated with the real-world object.

6. The method of claim 5, wherein the plurality of virtual objects and the plurality of virtual motions are specified with reference to a purchase history on a platform associated with animation authoring.

7. The method of claim 1, wherein in the generating step, at least one of an augmented reality (AR) video and a mixed reality (MR) video is generated by combining the animation sequence with a real-world video.

8. The method of claim 1, wherein the generated animation sequence is allowed to be shared between a plurality of users.

9. The method of claim 8, wherein a user interface for allowing at least one of the plurality of users to modify at least one of the virtual object and the virtual motion in the shared animation sequence is provided.

10. A non-transitory computer-readable recording medium having stored thereon a computer program for executing the method of claim 1.

11. A system for authoring an animation, the system comprising:
a characteristic information acquisition unit configured to acquire characteristic information on an appearance and a motion of a real-world object from an input video;
a determination unit configured to determine a virtual object associated with the real-world object with reference to the characteristic information on the appearance of the real-world object, and determine a virtual motion associated with the real-world object with reference to the characteristic information on the motion of the real-world object; and
a sequence generation unit configured to generate an animation sequence on the basis of the virtual object and the virtual motion,
wherein the determination unit is configured to determine a virtual motion similar to the motion of the real-world object at or above a predetermined level, among a plurality of virtual motions, as the virtual motion associated with the real-world object, and
wherein a manner of determining the virtual motion similar to the motion of the real-world object at or above the predetermined level is changed according to presence or absence of a skeleton of the real-world object.

12. The system of claim 11, wherein the characteristic information acquisition unit is configured to extract the characteristic information on the appearance and motion of the real-world object by analyzing the real-world object in the input video using an object analysis model, and
wherein the object analysis model is a model that is trained using a plurality of real-world objects and characteristic information on appearances and motions associated with the plurality of real-world objects.

13. The system of claim 11, wherein the characteristic information acquisition unit is configured to extract the characteristic information on the appearance and motion of the real-world object with reference to a type of the real-world object specified in the input video.

14. The system of claim 11, wherein the characteristic information acquisition unit is configured to further acquire characteristic information on an emotion of the real-world object from the input video.

15. The system of claim 11, wherein the determination unit is configured to determine a virtual object having an appearance similar to the appearance of the real-world object at or above a predetermined level, among a plurality of virtual objects, as the virtual object associated with the real-world object.

16. The system of claim 15, wherein the plurality of virtual objects and the plurality of virtual motions are specified with reference to a purchase history on a platform associated with animation authoring.

17. The system of claim 11, wherein the sequence generation unit is configured to generate at least one of an augmented reality (AR) video and a mixed reality (MR) video by combining the animation sequence with a real-world video.

18. The system of claim 11, further comprising a sharing management unit configured to allow the generated animation sequence to be shared between a plurality of users.

19. The system of claim 18, wherein the sharing management unit is configured to provide a user interface for allowing at least one of the plurality of users to modify at least one of the virtual object and the virtual motion in the shared animation sequence.

\* \* \* \* \*